United States Patent [19]

Udagawa

[11] Patent Number: 4,898,396
[45] Date of Patent: Feb. 6, 1990

[54] STEEL LAMINATE GASKET

[75] Inventor: Tsunekazu Udagawa, Ichikawa, Japan

[73] Assignee: Ishikawa Gasket Co., Ltd., Tokyo, Japan

[21] Appl. No.: 231,303

[22] Filed: Aug. 11, 1988

[51] Int. Cl.[4] .............................................. F16J 15/08
[52] U.S. Cl. ................................ 277/235 B; 277/234; 277/236
[58] Field of Search ............... 277/231, 232, 233, 234, 277/235 B, 235 R, 213, 227, 166, 235 A

[56] References Cited

U.S. PATENT DOCUMENTS

| 1,846,402 | 2/1932 | Oven | 277/235 B |
|---|---|---|---|
| 1,851,948 | 3/1932 | Summers | 277/213 |
| 1,911,226 | 5/1933 | Fitzgerald | 277/231 |
| 1,982,759 | 12/1934 | Rosen | 277/235 B |
| 3,567,234 | 3/1971 | Skrycki | 277/235 B |
| 4,728,110 | 3/1987 | Nakasone | 277/235 B X |
| 4,739,999 | 4/1988 | Ishii et al. | 277/235 B |
| 4,776,601 | 10/1988 | Yamada | 277/235 B X |
| 4,799,695 | 1/1989 | Yoshino | 277/234 X |
| 4,803,965 | 2/1989 | Udagawa et al. | 277/235 X |
| 4,809,653 | 3/1989 | Udagawa et al. | 277/235 B X |

FOREIGN PATENT DOCUMENTS

| 113372 | 6/1984 | Japan | 277/227 |
|---|---|---|---|
| 121259A | 7/1984 | Japan | 277/235 B |

Primary Examiner—William A. Cuchlinski, Jr.
Assistant Examiner—Jeffrey J. Hohenshell
Attorney, Agent, or Firm—Kanesaka and Takeuchi

[57] ABSTRACT

A steel laminate gasket of the invention is used for an internal combustion engine having at least one cylinder hole and through hole therein. The gasket comprises a first plate, a second plate and at least one third plate situated between the first and second plates. The first plate is provided with a first sealing device formed around the hole corresponding to the cylinder hole of the engine. The third plate is provided with a hole, the diameter of which is larger than that of the diameter of the first sealing device so that the first sealing device is located inside the hole of the third plate when assembled, and sealing layers formed on both sides of the third plate. The gasket further includes a second device for at least covering the first sealing device, and a third sealing device formed on at least one of the first, second and third plates for sealing around the through hole. Leakage around the cylinder hole and through hole is effectively prevented.

12 Claims, 2 Drawing Sheets

STEEL LAMINATE GASKET

BACKGROUND OF THE INVENTION AND RELATED ART STATEMENT

The present invention relates to a steel laminate gasket for an internal combustion engine to securely seal around cylinder holes and through holes.

An internal combustion engine is provided with a plurality of cylinder holes and other holes, such as holes for bolt, water, oil and push rod. When an engine is actuated, high pressure and high temperature are applied to the cylinder holes due to combustion of a fuel, while relatively low pressure and low temperature are applied to the other holes.

In order to properly seal between two engine blocks of an engine, a gasket is situated between the two engine blocks and is tightened so that areas around the cylinder holes as well as the other holes are securely sealed. However, since the sealing conditions around the cylinder holes and other holes are different as explained above, it is not easy to securely seal around all the holes.

It has been known that beads are formed around the cylinder holes and other holes to securely seal around the holes. However, in case the beads are simply formed, sealing can not be perfectly made. Namely, while an engine is actuated, leakage may happen around the cylinder holes and other holes.

In some cases, seal rings may be separately attached around holes for water and oil. However, since the seal rings are separately prepared and installed in the gasket, it requires additional cost. Therefore, this method is not practical.

Accordingly, an object of the present invention is to provide a steel laminate gasket which can seal properly around all kinds of holes in an engine.

Another object of the present invention is to provide a steel laminate gasket as stated above, which can be manufactured easily and economically.

Further objects and advantages of the present invention will be apparent from the following description of the invention.

SUMMARY OF THE INVENTION

In accordance with the present invention, a steel laminate gasket is installed in an internal combustion engine having at least one cylinder hole and at least one through hole. The gasket comprises a first plate, a second plate situated under the first plate, and at least one third plate situated between the first and second plates.

The first plate is provided with at least one first hole corresponding to the cylinder hole of the engine, at least one second hole corresponding to the through hole of the engine, and first means for sealing around the first hole. The second plate is provided with at least one third hole corresponding to the cylinder hole of the engine, and at least one fourth hole corresponding to the through hole of the engine.

On the other hand, the third plate is provided with at least one fifth hole having the diameter larger than the diameter of the first means. When the gasket is assembled, the first means is situated inside the fifth hole. Namely, the third plate does not extend to a position adjacent the cylinder hole.

The third plate further includes at least one sixth hole corresponding to the through hole of the engine, and sealing layers formed on both sides of the third plate. The sealing layers are made of soft materials to prevent fluid from passing between the plates. Since the third plate is not exposed to high temperature from the cylinder hole, the sealing layers may be made of soft materials which is not strong against heat but effective to fluid.

Preferably, one third plate is situated between the first and second plates. However, if necessary, two or more third plates may be installed between the first and second plates.

The gasket is further provided with second means for at least covering the first means around the first hole, and third means for sealing around the through hole of the engine. The third means is formed on at least one of the first, second and third plates to securely seal around the through hole when the gasket is tightened.

The first means may be at least one bead to seal around the cylinder hole. The second means may be a curved portion with a flange integrally formed with the second plate. Also, the second means may be a grommet situated inside the first and third holes. The third means may be a bead formed on the third plate, or beads formed on the first and second plates.

DETAILED DESCRIPTION OF PREFERRED EMBODIMENTS

Figure 1:
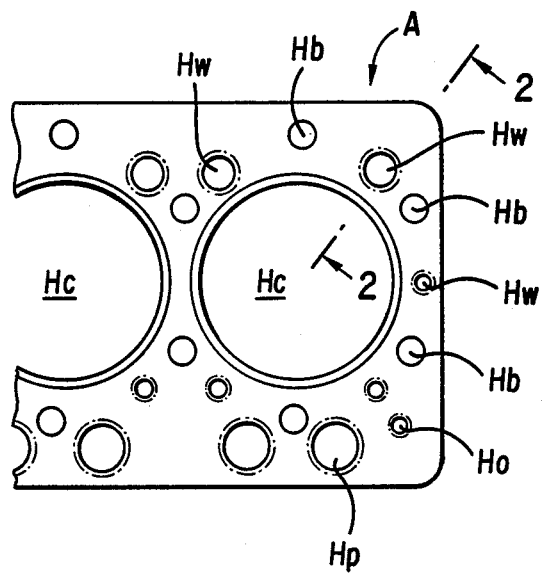
FIG. 1 is a partial plan view of a first embodiment of a steel laminate gasket in accordance with the present invention.
Figure 2:
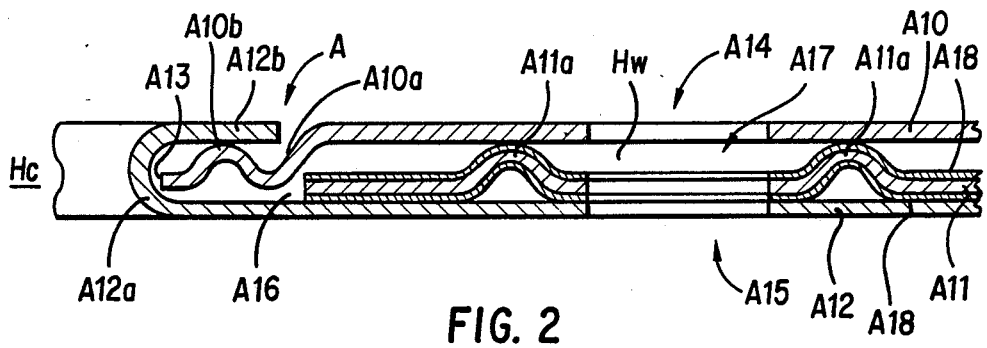
FIG. 2 is an enlarged section view taken along line 2—2 in FIG. 1.

Referring to FIGS. 1 and 2, a first embodiment A of a steel laminate gasket of the present invention is shown. The gasket A is provided with cylinder holes Hc, bolt holes Hb, water holes Hw, oil holes Ho and push rod holes Hp, as in the conventional gasket. The areas around the water holes Hw, oil holes Ho and push rod holes Hp are sealed in the same manner. For convenience, the cross section of the water hole Hw and cylinder hole Hc is shown in FIG. 2.

As shown in FIG. 2, the gasket A comprises an upper plate A10, a lower plate A12 and a middle plate A11 situated between the upper and lower plates A10, A12. The upper plate A10 includes a hole A13 for the cylinder hole Hc and a hole A14 for the water hole Hw. Also, the upper plate A10 is provided with an inclined portion A10a extending toward the lower plate A12, and a bead A10b extending around the hole A13. The bead A10b seals around the hole A13 when the gasket A is tightened.

The lower plate A12 is provided with a hole A15 for the water hole Hw, a curved portion A12a, and a flange A12b situated above the bead A10b. The curved portion A12a is located inside the hole A13 of the upper plate A10 to define the cylinder hole Hc.

The middle plate A11 is provided with a hole A16 and a hole A17 for the water hole Hw. The diameter of the hole A16 is larger than the diameter of the inclined portion A10a formed around the bead A10b. Therefore, the inclined position A10a is located inside the hole A16 when the gasket A is assembled together.

Also, the middle plate A11 is provided with a bead A11a around the hole A17, and upper and lower coatings A18 covering the entire surfaces thereof. The bead A11a seals around the hole A17 when the gasket A is tightened. The coatings A18 are made of a soft material to provide resiliency. Gum, such as NBR gum and silicone gum is preferred, but soft resin may be used. The thickness of the coating A18 is 5-100 micra, preferably 10-50 micra.

When the gasket A is situated between two engine blocks (not shown) and is tightened, the bead A10b provides sealing pressure around the cylinder hole Hc, while the bead A11a provides sealing pressure around the water hole Hw. The gasket A can properly seal around the cylinder hole Hc and water hole Hw.

It is important in the present invention that the coating is made of a soft material, because the soft material seals properly between the plates to thereby prevent leakage of fluid from the water hole Hw. It is also important that the middle plate A11 does not extend to an area adjacent the cylinder hole Hc, because if the middle plate A11 extends to an area adjacent the cylinder hole Hc, the middle plate A11 is exposed to high temperature, which causes creep relaxation of the soft material formed on the middle plate A11. As a result, leakage may happen around the cylinder hole Hc.

Namely, an effective coating material around the water hole Hw is weak against heat. Therefore, such a coating material can not be applied onto a plate for sealing around the cylinder hole Hc. Accordingly, a middle plate which does not extend to an area adjacent the cylinder hole Hc is used, and a coating material effective to fluid is applied onto the middle plate.

Generally, small scratches are formed on outer surfaces of an engine block when manufacturing the engine block. In order to fill up the small scratches, coatings which are strong against heat may be formed on outer surfaces of the gasket. Therefore, in the present invention, thin coatings may be formed on the outer surfaces of the upper and lower plates A10, A12 which contact the engine blocks.

Figure 3:
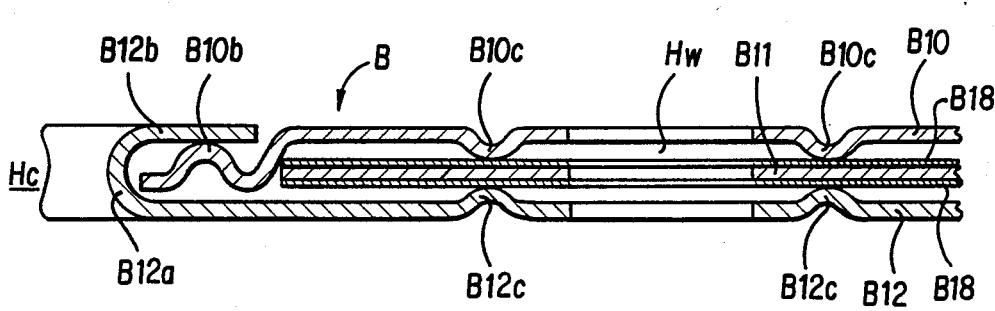
FIG. 3 is a section view, similar to FIG. 2, of a second embodiment of a steel laminate gasket of the present invention.

FIG. 3 shows a second embodiment B of a steel laminate gasket of the present invention. The gasket B comprises an upper plate B10 with a bead B10b, a middle plate B11 with coatings B18, and a lower plate B12 with a curved portion B12a and a flange B12b, similar to the gasket A. However, the middle plate B11 does not have a bead. Instead, the upper plate B10 is provided with a bead B10c around the water hole Hw, and the lower plate B12 is provided with a bead B12c around the water hole Hw. The beads B10c, B12c have the same diameter and extend toward the middle plate B11.

In the gasket B, two beads B10c, B12c are provided around the water hole Hw, so that when the gasket B is tightened, high sealing pressure is obtained. The other structure and advantages of the gasket B are the same as those of the gasket A.

Figure 4:
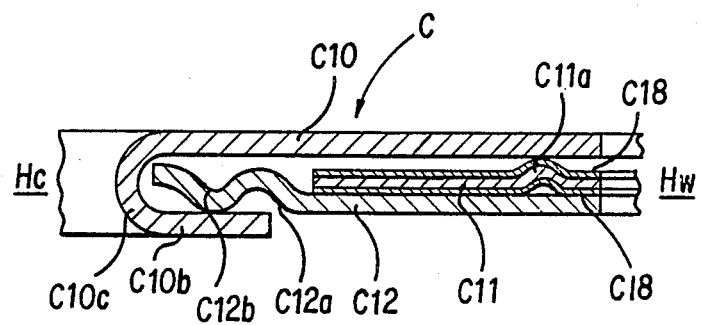
FIGS. 4 and 5 are section views, similar to FIG. 2, of third and fourth embodiments of a steel laminate gasket of the present invention.

FIG. 4 shows a third embodiment C of a steel laminate gasket of the present invention. The gasket C comprises an upper plate C10, a middle plate C11 with a bead C11a and coatings C18, and a lower plate C12, similar to the gasket A. However, the upper plate C10 is provided with a curved portion C10a and a flange C10b, while the lower plate C12 is provided with an inclined portion C12a and a bead C12b. Namely, the gasket C has a structure such that the gasket A is inverted while the middle plate is left as it is.

In the gasket C, the middle plate C11 is made thinner than the middle plate A11 to provide high sealing pressure around the cylinder hole Hc. Namely, since the middle plate C11 can operate as a surface pressure regulation plate for the bead C12b, the thickness of the middle plate C11 is made thin. Therefore, high sealing pressure is obtained around the cylinder hole Hc.

Figure 5:
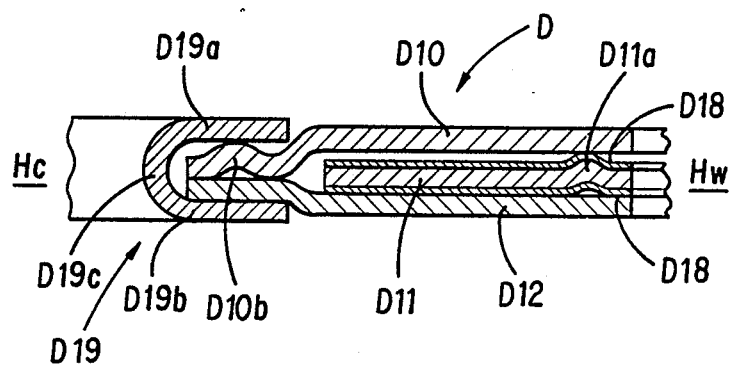

FIG. 5 shows a fourth embodiment D of a steel laminate gasket of the present invention. The gasket D comprises an upper plate D10 with a bead D10b, a middle plate D11 with a bead D11a and coatings D18, and a lower plate D12, similar to the gasket A. However, the gasket D is further provided with a grommet D19 having upper and lower flanges D19a, D19b and a curved portion D19c. The upper flange D19a is located above the bead D10b, while the lower flange D19b is located under a part of the lower plate D12. The curved portion D19c defines the cylinder hole Hc.

In the gasket D, the grommet D19 is used to seal around the cylinder hole Hc. However, the gasket D operates as in the gasket A.

In accordance with the present invention, the middle plate is not located in areas where high temperature is applied, and the coating material which is weak against heat but effective to seal around fluid holes is coated onto the middle plate. Therefore, areas around the fluid holes can be effectively sealed by even a single bead.

When the sealing pressure around the cylinder holes Hc is to be changed, the thickness of the middle plate may be changed, or the quality of the plate having a bead around the cylinder hole Hc may be changed as well. Also, when the sealing pressure around the fluid holes is to be changed, the thickness or quality of the plate having a bead for sealing around the fluid hole may be changed.

While the invention has been explained with reference to the specific embodiments of the invention, the explanation is illustrative and the invention is limited only by the appended claims.

What is claimed is:

1. A steel laminate gasket for an internal combustion engine having at least one cylinder hole and at least one through hole therein, comprising:

a first plate having at least one first hole corresponding to the cylinder hole of the engine, at least one second hole corresponding to the through hole of the engine, and first means for sealing around the first hole to securely seal around the same when the gasket is tightened, a second plate situated under the first plate, said second plate having at least one third hole corresponding to the cylinder hole of the engine, and at least one fourth hole corresponding to the through hole of the engine, at least one third plate situated between the first and second plates, said third plate including at least one fifth hole having the diameter larger than the diameter of the first means so that the first means is situate inside the fifth hole when the gasket is assembled, at least one sixth hole corresponding to the through hole of the engine, and sealing layers formed on both sides of the third plate, second means for covering at least first means around the first hole to securely seal therearound, and third means for sealing around the through hole of the engine, said third means being formed on at least one of the first, second and third plates to securely seal around the through hole when the gasket is tightened.

2. A steel laminate gasket according to claim 1, wherein said first means formed on the first plate is at least one bead situated around the first hole, said bead abutting against the second plate when the gasket is tightened.

3. A steel laminate gasket according to claim 2, wherein said third means is at least one bead situated around the through hole.

4. A steel laminate gasket according to claim 3, wherein said sealing layers are made of soft materials to prevent fluid from passing between the plates.

5. A steel laminate gasket according to claim 4, wherein said second means is a grommet including a curved portion situated inside the first and third holes, an upper flange situated above the first means, and a lower flange situated below a part of the second plate.

6. A steel laminate gasket according to claim 5, wherein said third means is a bead formed on the third plate, said bead extending around the sixth hole.

7. A steel laminate gasket according to claim 10, wherein said third means comprises a bead formed on the first plate around the second hole, and a bead formed on the second plate around the fourth hole, said beads on the first and second plates having the same size and projecting toward the third plate.

8. A steel laminate gasket according to claim 4, wherein said second means comprises a curved portion and a flange and is integrally connected to the second plate, said curved portion extending from the second plate toward the first plate around the third hole to define the third hole, and said flange extending from the curved portion in the direction away from the third hole, said flange being located above the first means.

9. A steel laminate gasket according to claim 5, wherein said third means is a bead formed on the third plate, said bead extending around the sixth hole.

10. A steel laminate gasket according to claim 5, wherein said third means comprises a bead formed on the first plate around the second hole, and a bead formed on the second plate around the fourth hole, said beads on the first and second plates having the same size and projecting toward the third plate.

11. A steel laminate gasket according to claim 8, wherein the thickness of the third plate relative to the first plate is changed so that the sealing pressure formed by the first means is regulated.

12. A steel laminate gasket for an internal combustion engine having at least one cylinder hole and at least one through hole therein, comprising:
 a first plate having at least one first hole corresponding to the cylinder hole of the engine, at least one second hole corresponding to the through hole of the engine, and a bead situated around the first hole to securely seal around the same when the gasket is tightened.
 a second plate situated under the first plate, said second plate having at least one third hole corresponding to the cylinder hole of the engine, at least one curved portion to define the third hole, at least one flange extending from the curved portion and situated above the bead of the first plate, and at least one fourth hole corresponding to the through hole of the engine,
 at least one third plate situated between the first and second plates, said third plate including at least one fifth hole having a diameter larger than the diameter of the bead of the first plate so that the bead does not pile the third plate and is located inside the fifth hole when the gasket is assembled, at least one sixth hole corresponding to the through hole of the engine, and soft sealing layers formed on both sides of the third plate, and
 at least one sealing bead situated around the through hole of the engine, said sealing bead being formed on at least one of the first, second and third plates to securely seal around the through hole when the gasket is tightened.

* * * * *